United States Patent [19]
Street

[11] Patent Number: 5,170,222
[45] Date of Patent: Dec. 8, 1992

[54] MEASUREMENT OF SPECTRA

[75] Inventor: Graham S. B. Street, Reading, Great Britain

[73] Assignee: ICS-Texicon Limited, England

[21] Appl. No.: 598,557

[22] Filed: Oct. 16, 1990

[30] Foreign Application Priority Data

Oct. 17, 1989 [GB] United Kingdom ............... 8923411

[51] Int. Cl.⁵ ...................... G01J 3/18; G01J 3/36; G01J 3/42
[52] U.S. Cl. .................. 356/328; 356/334; 356/319; 359/15
[58] Field of Search ............ 356/328, 334, 319; 359/8, 15, 35

[56] References Cited

U.S. PATENT DOCUMENTS

| | | | |
|---|---|---|---|
| 4,455,088 | 6/1984 | Koike | 356/334 |
| 4,568,187 | 2/1986 | Kita et al. | 356/328 |
| 4,756,619 | 7/1988 | Gerlinger et al. | 356/319 |
| 4,966,458 | 10/1990 | Burns et al. | 356/328 |
| 4,968,143 | 11/1990 | Weston | 356/328 |

FOREIGN PATENT DOCUMENTS

1384281 2/1975 United Kingdom .
1537933 1/1979 United Kingdom .
2207253A 1/1989 United Kingdom .

Primary Examiner—Vincent P. McGraw
Attorney, Agent, or Firm—Lerner, David, Littenberg, Krumholz & Mentlik

[57] ABSTRACT

A dual beam spectrophotometer has a blazed concave reflective grating 25, formed using the interference fringes of a coherent light beam reflected back from a spherical convex mirror 73 having a center of curvature at a point 65. The point 65 is off the Rowland circle 79 of the grating 25, so as to provide a different surface of focus 81 at the position of a photodiode array 29 which detects the spectrum formed by the grating 25. This permits the angle of the photodiode array 29 to be selected for good linearity of the distribution of wavelength of the spectrum along the array while maintaining the spectrum in focus over the whole length of the array 29. In order to compensate for remaining non-linearities, the width of barrier zones 93 between adjacent diodes 49 in the photodiode array 29 may be varied, so that the pitch of the diodes 49 varies with position along the array 29.

9 Claims, 8 Drawing Sheets

MEASUREMENT OF SPECTRA

The present invention relates to the measurement of colour or electromagnetic spectra, and has particular application to spectrophotometers. Preferred embodiments relate to dual beam spectrophotometers.

Background information relating to some types of dual beam spectrophotometers is given in Patent Specification GB 1,537,933. In one particular type of dual beam spectrophotometer, a spherical light integrator (or integrating sphere) is used. Light, e.g. from a xenon lamp, is integrated by the integrator, and is used to illuminate a sample. Light from the sample is provided to a sample analyser, and integrated light from the integrator is provided to a reference analyser. In each analyser, the light is diffracted, e.g. by a reflective grating, and the spectrum thus formed falls on an array of photosensors. Differences in the outputs of the two arrays represents differences between the spectra, and thus the colour of the sample.

The manufacture of good quality reflective gratings for use in the analysers is difficult and expensive. Additionally, it can be difficult to avoid variations from one grating to another in the grating characteristics.

Additionally, it is generally convenient if a constant spacing along the photosensor array represents a constant difference in the wavelength of the diffracted light striking the photosensor array, so that successive photosensors detect different colours of light which are evenly spaced in wavelength. However, for accurate operation the diffracted light should also be in near-perfect focus at the photosensor array. The positioning of the photosensor array for the best degree of focus of the diffracted light may result in a function of change of wavelength with change of position along the photosensor array which is markedly non-linear.

A method of manufacturing a reflective grating is disclosed in Specification GB 1,384,281. In this method, a beam of coherent light is focused so as to converge towards a focal point. A convex reflecting surface, having a centre of curvature at the focal point, is placed in the beam so as to reflect the light back in the direction from which it has come. This creates an interference pattern in the light, comprising concentric spherical light and dark shells. A grating blank, having a photosensitive coating, is placed in the region of the interference pattern, so that the concentric shells intersect with the surface on which the grating is to be formed. The photosensitive material is affected by the interference pattern, and can subsequently be preferentially etched so as to form a stepped surface on the grating blank in which the positions of the steps are defined by the interference pattern of the light which exposed the photosensitive material.

It has been recognised that the principles of grating manufacture of GB 1,384,281 can be used to manufacture gratings suitable for use in the measurement of colour which gratings are relatively easy to manufacture and have reproducible characteristics which are substantially constant from one grating to another.

In one aspect of the present invention, there is provided a system for measuring colour comprising a diffraction grating and a photosensor array, in which the diffraction grating has a grating pattern corresponding to a pattern of interference between light incident on, and light reflected from, a reflector.

Preferably, the grating is a concave reflective grating and the system is arranged such that light falls on the grating from an aperture and is diffracted to the photosensor array, the centre of gravity of the region of best focus of lines normal to surfaces of constructive and destructive interference in the said interference pattern in the region of the grating pattern being spaced from the Rowland circle defined by the centre of the grating and the curvature of the grating. This changes the surface of focus of the diffracted light so that it also does not lie on this Rowland circle.

The photosensor array will be positioned around the surface of focus of the diffracted light so that the wavelengths of interest fall on the array. For best results it is normally necessary for the diffracted light to be close to perfect focus at the photosensor array. Therefore the array will typically extend along a tangent or a chord to the surface of focus at the wavelengths of interest, and this will determine its angle to the grating.

However, the variation in wavelength with change in distance along the array is a non-linear function, and the degree of non-linearity is affected by the angle the array makes to the grating. By varying the position of the above-mentioned centre of gravity, the angle of the surface of focus at the position where the photosensor array is to be placed may also be varied. This angle can be selected so as substantially to minimise the non-linearity of the function of change in wavelength with change in position along the array.

This allows the pitch of adjacent photosensors to represent as nearly as possible a constant change in wavelength over the length of the photosensor array. If some other, non-linear, function relating change in wavelength with change in position along the array is desired, then a different position may be chosen for the centre of gravity, so as to define a different surface of focus for the diffracted light, which has an angle at the position of the photosensor array which minimises the difference between the actual and the desired relationship between change in wavelength and change in position along the photosensor array.

In another aspect of the present invention, there is provided a photosensor array for use in the measurement of colour or electromagnetic spectra, in which the pitch of successive adjacent photosensors varies over the length of the array. In this way, it is possible to compensate for differences between the desired change in wavelength with change in photosensor from the actual change in wavelength with change in position along the photosensor array.

Typically the photosensors of the photosensor array will be semiconductor devices such as photodiodes. The construction and materials for the photosensors may be conventional, and may be chosen to provide photosensors having good sensitivity and/or other performance characteristics when irradiated with light of the wavelengths with which the photosensor array is intended to be used.

Figure 1:
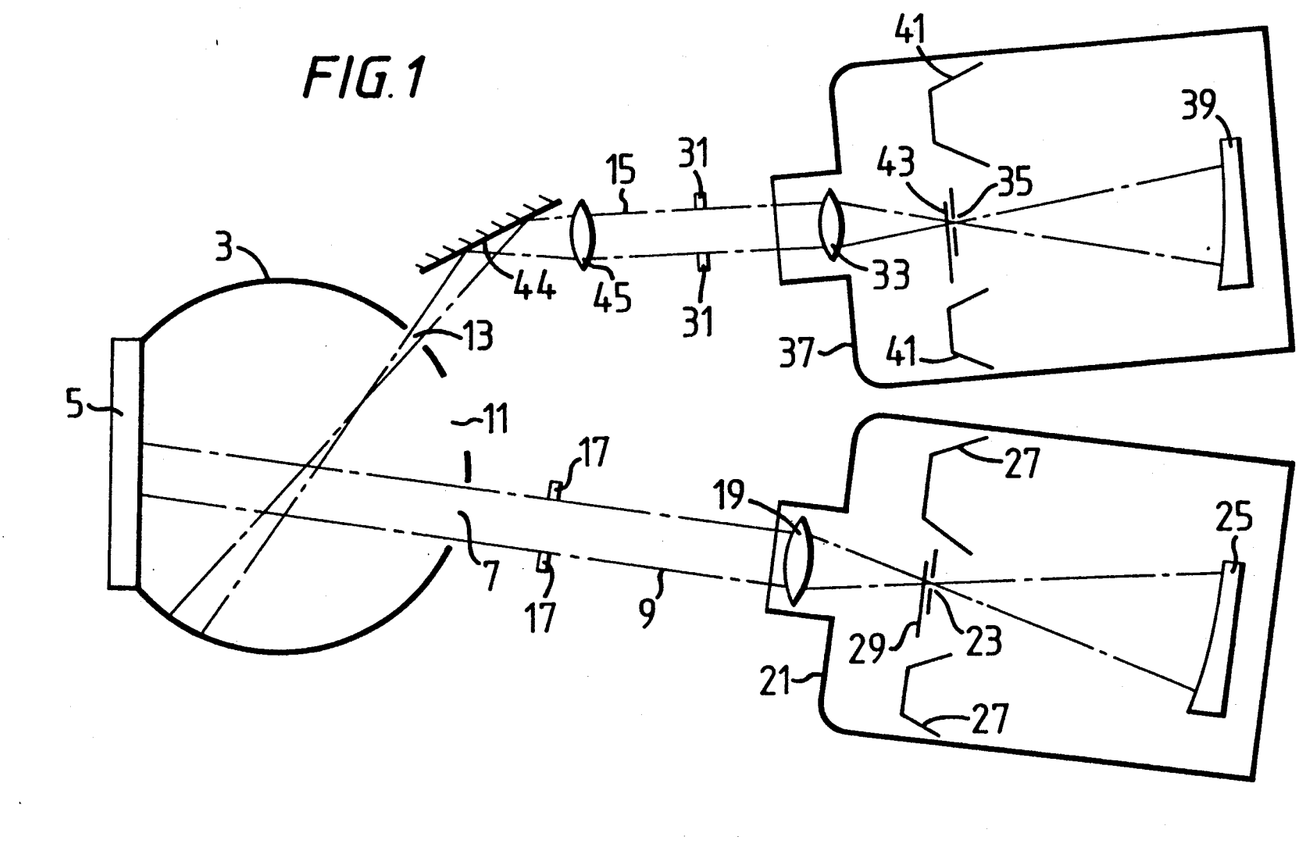
FIG. 1 is a schematic plan view of a spectrophotometer embodying the present invention.
Figure 2:
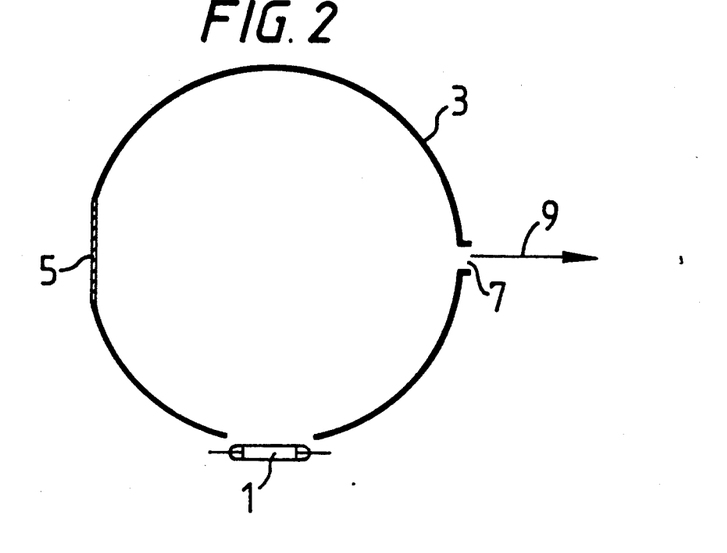
FIG. 2 is a schematic side view of the integrator of a spectrophotometer embodying the present invention.

Embodiments of the present invention, given by way of example, will now be described with reference to the accompanying drawings, in which:

FIG. 1 is a schematic horizontal section of a spectrophotometer embodying the invention, and FIG. 2 is a schematic side vertical section of the spherical integrator of the spectrophotometer of FIG. 1.

Light from a xenon lamp 1 is integrated in a spherical integrator 3 and illuminates a sample 5. Light from the sample 5 leaves the integrator 3 through an aperture 7 to form a sample beam 9. The sample beam passes to a sample analyser 21, where it is diffracted by a grating 25 to form a spectrum which is detected by a photosensor array 29. Light from the integrating surface of the spherical integrator 3 also leaves the integrator 3, through an aperture 13, to form a reference beam 15. The reference beam passes to a reference analyser 37, where it is diffracted by a grating 39 to form a spectrum which is detected by a photosensor array 43. In FIG. 1, the diffracted beams are not shown.

The output of the photosensor array 29 of the sample analyser 21 characterises the light from the sample 5. The output of the photosensor array 43 of the reference analyser 37 characterises the light illuminating the sample 5. By comparing the two outputs, a description of the colour of the sample 5 can be obtained.

The exit aperture 7 for the sample beam 9 is not exactly opposite the sample 5. This prevents specular reflection by the sample 5 of light from the reference analyser 21 back into it. Instead, the line from the aperture 7 to the centre of the sample 5 is at 8° to the normal of the surface of the sample 5. At the position on the integrator 3 from which light specularly reflected into the sample beam 9 will originate, there is a hole 11. The hole 11 can be closed by a continuation of the spherical integrating surface, or can be open to a "black hole" light trap. In this way, the specularly reflected component can be included or excluded from the sample beam 9 as desired.

The aperture 13 for the reference beam 15 has the same geometric relationship with the hole 11 as does the aperture 7 for the sample beam 9. The xenon lamp 1 is positioned so that light emitted by it does not fall directly on the sample 5 or enter the reference or sample beams 15, 9.

The sample beam 9 leaving the sample 5 passes through a sample beam stop 17 to a lens 19 of the sample analyser 21. The lens 19 focuses the light in the sample beam 9 to pass through a slit-shaped entrance aperture 23 so as to enter the light-tight interior of the analyser 21. The sample beam 9 within the sample analyser 21, diverging from the entrance aperture 23, falls on the grating 25, which is a concave reflective grating. The light is diffracted by the grating 25 at various orders, including the zero order (which may be regarded as the reflected component).

The zero order diffracted light enters a black-sided light trapping arrangement 27. Since this light has not been dispersed, it is not usable to determine the wavelength distribution of the light of the sample beam 9.

The grating 25 is blazed so as to increase the proportion of light diffracted into the first negative order, and this light for any given wavelength of interest is focused at the photodiode array 29. The light trapping arrangement 27 includes baffles which prevent light falling on the photodiode array 29 except the first negative order diffracted light from the grating 25.

Figure 4:
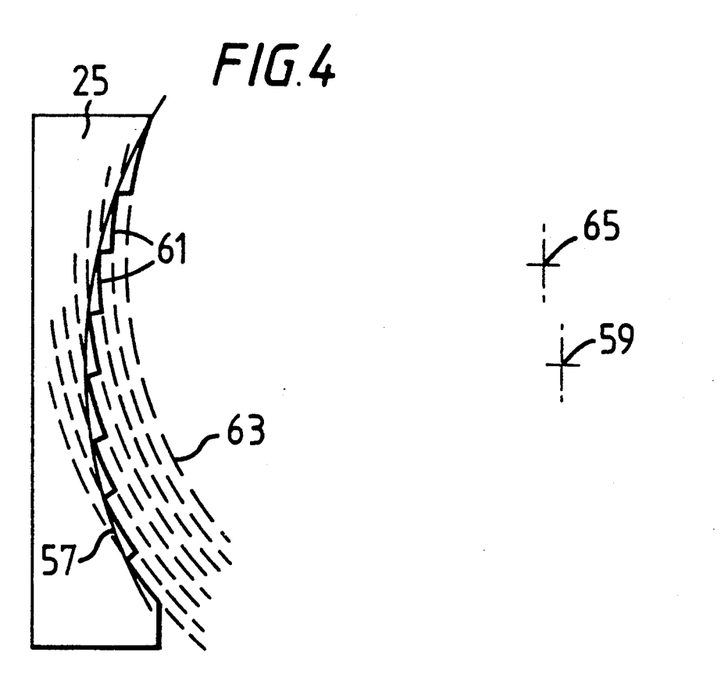
FIG. 4 is a schematic section through the grating of an analyser of the spectrophotometer of FIG. 1.

FIG. 4 shows schematically the shape of the grating 25. The reflective surface of the grating comprises a plurality of steps superimposed on a curved surface. The overall, or large scale, curvature of the surface is shown by a line 57. This curvature is spherical, and is centred on point 59. The front surfaces of the steps 61 follow respective ones of a plurality of concentric substantially spherical shells 63. The centre of gravity of the region of best focus of lines normal to the substantially spherical shells 63 is a point 65 spaced horizontally from the centre 59 of the large scale curvature 57 of the grating.

The shells 63 represent interference fringes of monochromatic light. The wavelength of this light will be referred to as "the making wavelength", and is presently preferred to be 457.9 nm. Therefore, the diffraction grating formed by the steps 61 will diffract light of the making wavelength originating from the region of the point 65 back to the region of the point 65, in the first negative order diffracted beam. Because the front surface of each of the steps 61 is substantially normal to the line joining it to the centre of gravity 65, the grating 25 is blazed, so as to preferentially direct light originating in the vicinity of the point 65 back towards this vicinity.

Figure 7:
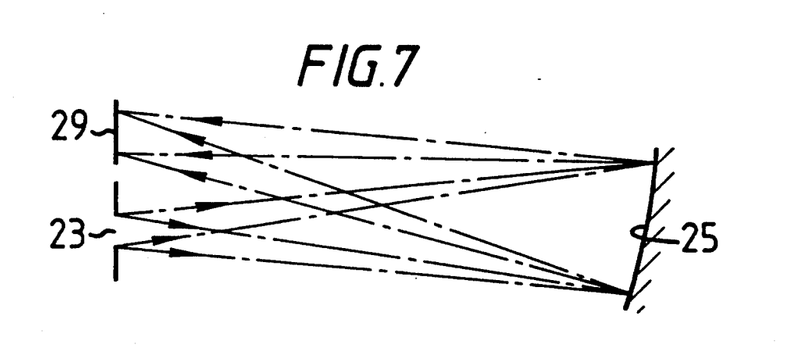
FIG. 7 is a schematic side view of beams incident on and refracted from the grating of FIG. 5.

In the present spectrophotometer, light falling on the grating 25 effectively originates from the entrance aperture 23. However, it is desired that this light should not return to the entrance aperture in the first order diffracted beam, but should pass to the photodiode array 29. Therefore the photodiode array 29 is placed just above the entrance aperture 23, in the substantially same vertical plane, and the grating 25 is tilted slightly (as shown in FIG. 7) so that the centre of gravity 65 of the above-mentioned region of best focus is between the entrance aperture 23 and the photodiode array 29. In this way light of the making wavelength falling on the grating from the entrance aperture is imaged to the position on the photodiode array immediately above the entrance aperture.

Figure 3:
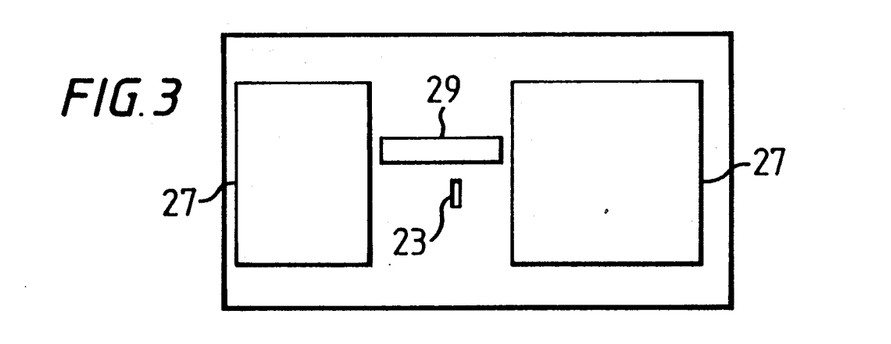
FIG. 3 is a schematic internal end view of an analyser of the spectrophotometer of FIG. 1.

The relative positions of the entrance aperture 23, the light trapping arrangement 27 and the photodiode array 29 are shown in FIG. 3, which is a schematic view of the front end wall of the light-tight interior of the sample analyser 21, roughly as seen from the position of the grating 25. In FIG. 1, the photodiode array 29 is not shown in its correct position, but is shown spaced slightly further from the grating 25 than the entrance aperture 23, for purposes of clarity.

Because the entrance aperture and the photodiode array are each spaced vertically from the centre of gravity point, the image of the entrance aperture 23 in the making wavelength will be astigmatic. In order to minimise the effects of this astigmatism, the photodiode array 29 is placed at the focus in the horizontal plane at which the image is vertically stretched but is not widened. The additional height of the vertically stretched image is accommodated by making the diodes of the photodiode array 29 taller than the entrance aperture 23.

Light falling on the diffraction grating from the entrance aperture 23, which light is of a wavelength other than the making wavelength, will be diffracted in the first order beam to a position on the photodiode array 29 sideways spaced from the position of diffracted light of the making wavelength. The images on the photodiode array formed by light of wavelength other than the making wavelength will tend to be slightly aslant, especially where the wavelength difference is large.

It is convenient to make the grating 25 using an argon laser emitting light of a wavelength of 457.9 nm. In the preferred embodiment of the present invention, the diode array covers diffracted wavelengths of approximately 360 nm to 750 nm, covering a range slightly greater than the visible spectrum. Therefore, the central wavelength of the photodiode array is 555 nm. The difference between this wavelength and the making wavelength of 457.9 nm means that the centre of the photodiode array 29 will be spaced sideways from the entrance aperture 23, as can be seen in FIG. 3.

Figure 5:
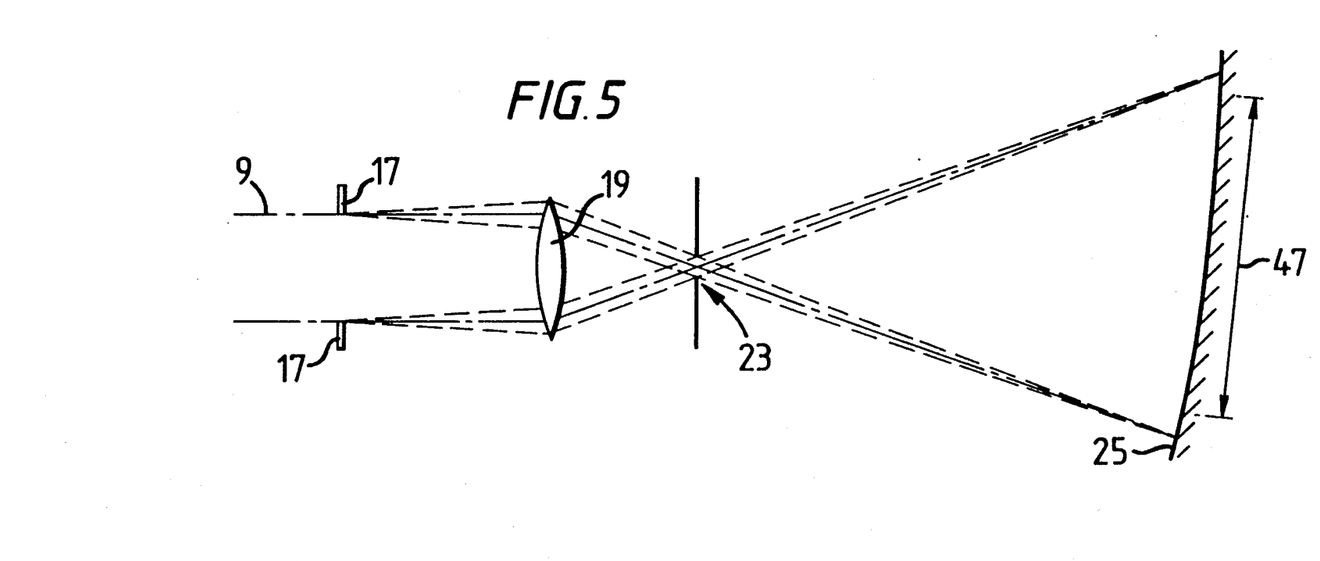
FIG. 5 illustrates schematically the optics of a beam of light incident on the grating of an analyser of the spectrophotometer of FIG. 1.

The arrangement of the optics of the light incident on the grating 25 is shown in more detail in FIG. 5. The lens 19 is spaced from the entrance aperture 23 by one focal length of the lens. Therefore, any light in the sample beam 9 which has one particular direction will be refracted to one particular place in the plane of the entrance aperture 23. Thus, each spot in the plane of the entrance aperture can be seen as representing a parallel sided sub-beam in the sample beam 9 having a particular direction. Only light arriving at the lens 19 from certain particular directions will be focused at points within the entrance aperture 23, and will therefore enter the light-tight interior of the analyser 21.

As shown in FIG. 3, the entrance aperture is rectangular. It is preferably from 2 to 10 mm high and from 0.2 mm to 1 mm wide. An aperture 4mm high and 0.64mm wide is suitable. The shape and size of the entrance aperture 23,35 determines the directions from which light approaching the lens 19 can enter the light-tight interior of the analyser 21.

The stop 17 is spaced from the lens 19 by a distance which causes the lens to focus an image of the stop on the grating 25. In this way, the stop controls the area of the grating surface which is illuminated. The total reflective area of the grating 25 is greater than the illuminated area defined by the stop 17. Thus, all light entering the light-tight interior of the analyser falls on the reflective surface. However, the diffracting area of the grating shown at 47 in FIG. 5, that is to say the area having diffraction lines, is smaller than the total reflective area. As can be seen in FIG. 5, the size of the illuminated area of the grating is greater than the area 47, so that the diffracting area is overfilled. Thus, the area from which light is diffracted by the grating is defined by the size 47 of the diffracting area. Other arrangements are possible. For example, the illuminated area as defined by the stop 17 may be smaller than the diffracting area of the grating 25, so that the area from which light is diffracted is defined by the stop.

Figure 6:
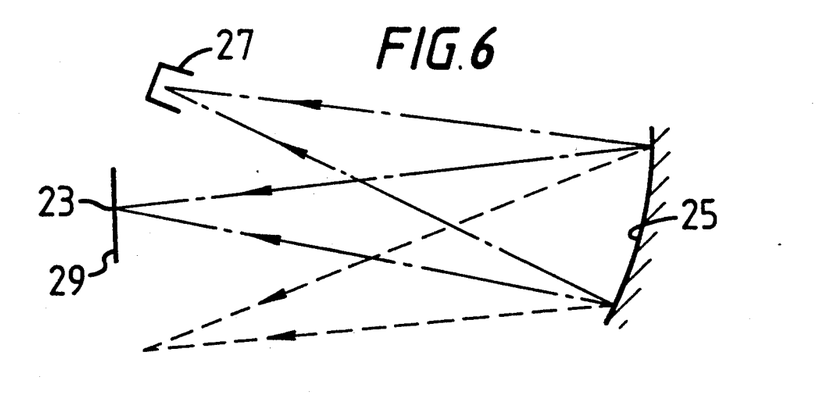
FIG. 6 is a schematic plan view of beams of light leaving the grating of FIG. 5.

FIG. 6 shows a plan view of the paths of the diffracted beams leaving the grating 25. FIG. 7 shows a side view of the paths of the incident and diffracted beams. The large scale curvature of the reflective surface of the grating 25 focuses the light falling on it from the entrance aperture 23 to an image of the aperture. The grating 25 is angled relative to the position of the entrance aperture 23, so that the light reflected from the grating without diffraction (i.e. the zero order diffracted beam) is directed into the light trapping arrangement 27. The light trapping arrangement 27 has baffles which separate the wanted light from the unwanted light.

In spite of the blaze of the grating, a small proportion of the diffracted light will enter orders of diffraction other than the first negative order and therefore FIG. 6 shows the second negative order diffracted light in broken lines.

All the wavelengths in the zero order beam will be focused to an image of the entrance aperture 23 at substantially the same position in the light trapping arrangement 27. However, in the first and second order diffracted beams different wavelengths of light will form focused images at different positions. The first and second order diffracted beams shown in FIG. 6 are for a single wavelength of light only.

In FIG. 6, the entrance aperture 23 is treated as being a point source of light. FIG. 7 shows the aperture as having a finite height, so that the image of the entrance aperture focused on the photodiode array 29 also has a finite height.

Figure 8:
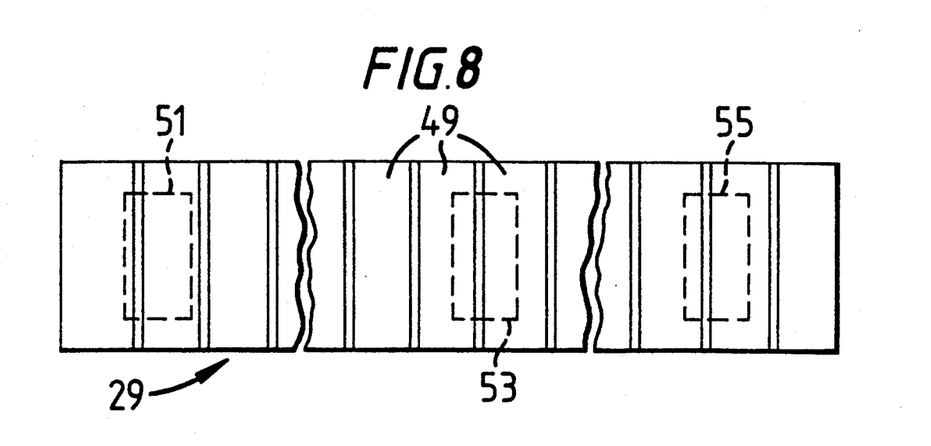
FIG. 8 is a schematic view of the photodiode array of an analyser of the spectrophotometer of FIG. 1.

FIG. 8 illustrates schematically the photodiode array 29. The array comprises forty diodes 49. Each diode 49 has a usable active area of 555 $\mu$m by approx. 6mm. The entrance aperture 23 is imaged onto the photodiode array substantially at real size, so that the image of the entrance aperture for any particular wavelength of light is slightly wider than the usable active area of one diode 49, but is less tall than the usable active area. As mentioned above, the diodes are made taller than the entrance aperture 23 in order to compensate for elongation of the image of the entrance aperture as a result of astigmatism. Images of the entrance aperture for three different wavelengths of diffracted light are shown in broken outline at 51,53 and 55 in FIG. 8. The width of the diodes 49 is exaggerated in FIG. 8.

As shown in FIG. 1, the reference beam 15 passes through a reference beam stop 31, to a lens 33, which focuses it on a slit-like entrance aperture 35 of the light-tight interior of the reference analyser 37. The reference analyser 37 has a grating 39, a light trapping arrangement 41 and a photodiode array 43, and is arranged substantially identically with the sample analyser 21.

In order to keep the spectrophotometer more compact, the reference beam 15 is bent by a mirror 44, so as to be almost parallel with the sample beam 9, permitting the sample analyser 21 and the reference analyser 37 to be placed side-by-side.

The sample beam 9 originates from a surface of the sample 5 which is essentially planar, whereas the interior surface of the integrator 3 from which the reference beam 15 originates is curved. In order to compensate for this, a lens 45 is placed in the reference beam 15 so that parallel sided light in the reference beam 15 has converged and crossed over inside the integrator 3, and is not parallel sided as it leaves the surface of the integrator 3. This enables each part of the reference beam to make substantially the same angle with the surface of the integrator 3, the angle being the same as the angle the reference beam 9 makes with the surface of the sample 5.

The reference beam 15 may be narrower than the sample beam 9, and the lens 33 may accordingly be smaller and have a shorter focal length than the lens 19. This reduces the size of the exit aperture 13 through which the reference beam 15 leaves the integrator 3. A narrow reference beam is possible because it is a beam of white light and has a relatively high intensity. Thus even a narrow beam provides sufficient light to the reference analyser 37.

The spectrophotometer may be used to measure the transmission colour of translucent samples, as well as the reflection colour of samples. In this case, the reflection sample 5 is replaced by a white surface, so that both beams 9,15 leave the integrator 3 with white light. A transmission cell, containing the transmission sample, is placed in one of the beams before it reaches the analyser. The system may be designed so that the transmission cell is placed in beam 15, in which case this acts as the sample beam while the beam 9 acts as the reference beam.

Figure 9:
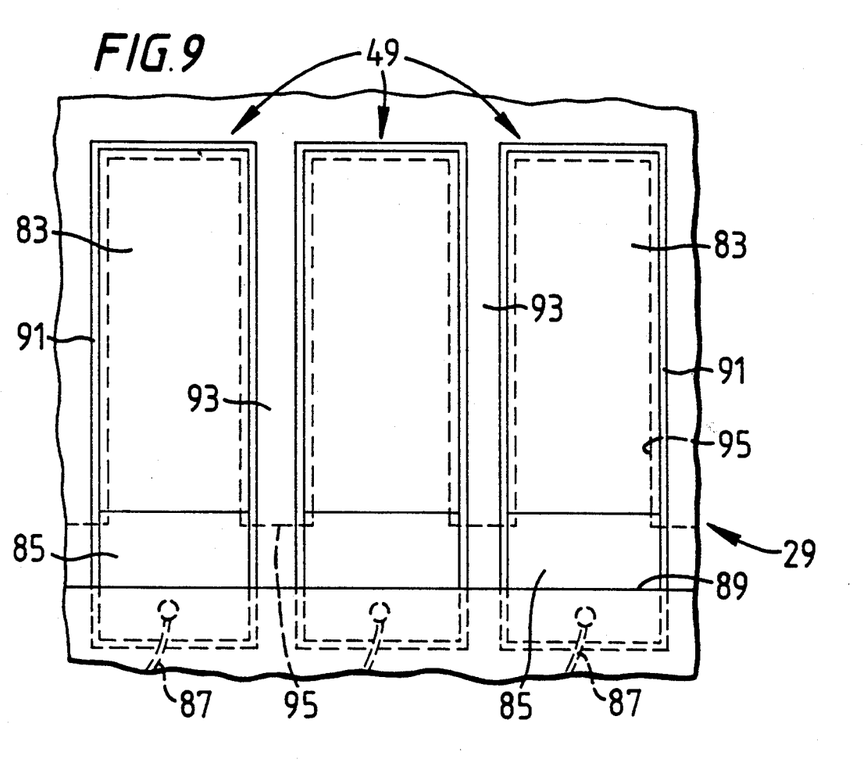
FIG. 9 is a schematic detailed view of a portion of the photosensor array of FIG. 8.

FIG. 9 is an enlarged schematic view of a portion of the photodiode array 29, 43. Each diode 49 is a photodiode manufactured using conventional semiconductor techniques. It has an active area 83 which is 6.0 mm long and 575 µm wide. At one end of the active area, there is a non-sensitive area 85, which does not respond to light falling on it. A respective lead-out wire 87 is bonded onto each non-sensitive area 85. For mechanical protection, the bonds are covered by a region of epoxy resin 89, which covers part of the non-sensitive area 85 but which stops 1 mm short of the active area 83.

Each diode 49 is surrounded by a separation region 91 of undoped substrate, which is 20 µm wide. Between the separation regions 91 of adjacent diodes 49, there is a boron-doped barrier region 93. The barrier region 93 is grounded, and serves to minimise crosstalk between adjacent diodes.

The distance between the centre lines of adjacent diodes 49 averages 643 µm.

In order to control more precisely the effective active area of the diodes, an aluminium shadow mask 95 (shown in broken lines in FIG. 14) extends between each diode 49 and round the three sides of the active area 83 not bounded by the non-sensitive area 85. This shadow mask 95 overlaps the active area 83 by 10 µm.

Figure 10:
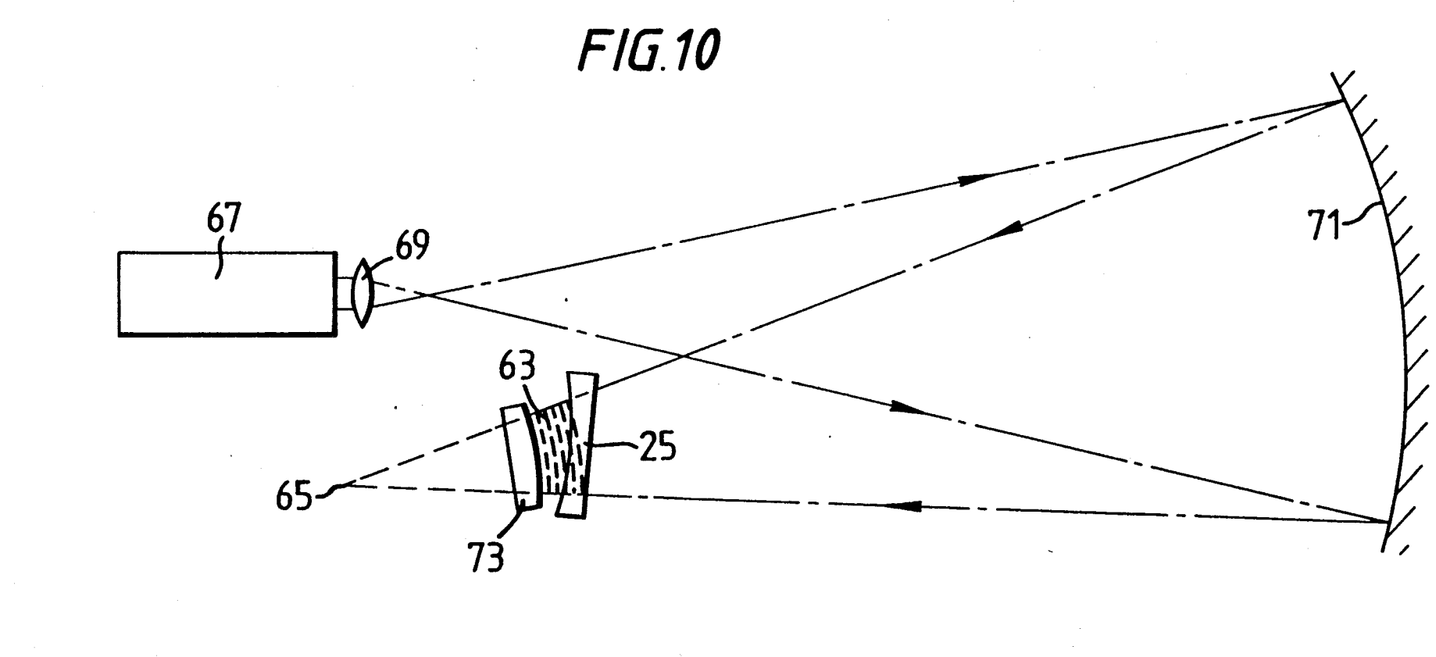
FIG. 10 is a schematic view of the system for manufacturing the grating of FIG. 4.

The grating is manufactured using a system illustrated in FIG. 10. In this system, a beam of light of the making wavelength is produced by a laser 67, for example an argon laser producing light of 457.9 nm. The light passes through a short focal length lens 69, such as a microscope objective, and is incident on a large, concave, mirror 71. The mirror 71 focuses the light. A smaller, convex, mirror 73 is placed between the concave mirror 71 and the point of focus. The reflective surface of the convex mirror 73 is substantially spherical, with its centre at the point of focus. Accordingly, it reflects the focused light from the concave mirror 71 back towards the mirror 71. The centre of the convex mirror 73 will be the centre of gravity point 65.

The light reflected from the convex mirror 73 interferes with the light incident on the convex mirror 73, to set up standing waves or an interference pattern, in the form of concentric light and dark shells centred on the point 65.

The shape of the interference pattern shells, and the position of the centre of gravity point 65, will be determined by the shape of the convex mirror 73. It is not absolutely necessary that the light from the concave mirror 73 should be focussed to the centre of gravity point 65, but it is advantageous if it converges towards the region of this point. This has the result that light reflected from the convex mirror 73 is reflected back substantially on its own path.

Figure 11:
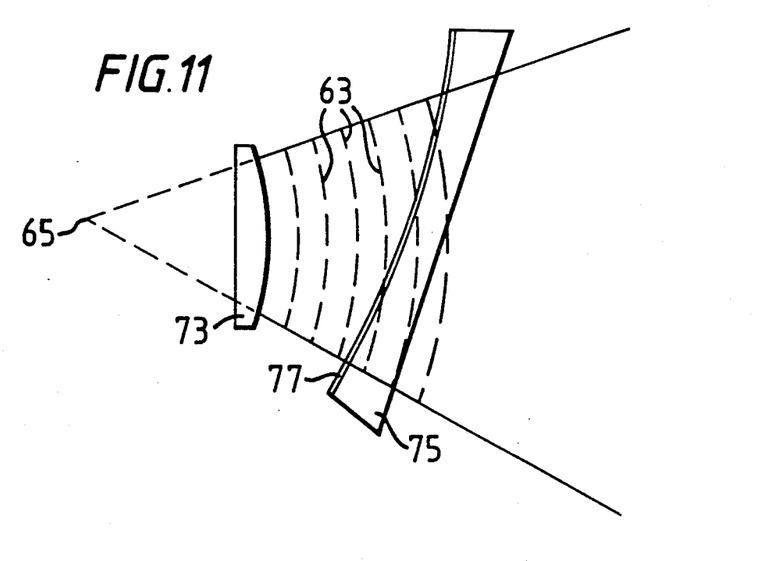
FIG. 11 is a more detailed view of part of the system of FIG. 10.

As shown in FIG. 11, a grating blank comprises a transparent substrate 75, typically of silica or low thermal expansivity glass, having a surface curved to provide the large scale curvature 57 of the grating. This curved surface is cleaned and then coated, e.g. spin coated, with a thin layer 77 of a known photosensitive material. The layer may have a thickness which is a few times the wavelength of the making light.

The coated blank is placed in a jig, which holds it in a precisely defined position relative to the other parts of the system of FIG. 10. The blank is angled so that the shells of the interference pattern intercept the curved coated surface of the blank. FIG. 11 shows the relative positions of the convex mirror 73, the shells 63 of the interference pattern and the grating substrate 75 bearing the photosensitive coating 77.

The intersection of the photosensitive coating 77 with the interference pattern results in lines in the coating 77 exposed to a relatively high intensity of light, and lines exposed to a relatively low intensity or substantially no light, with intermediate portions being exposed to intermediate amounts of light.

Following exposure of the photosensitive coating 77, the grating blank is developed by etching the photosensitive coating 77 to form the steps 61 of FIG. 4 in accordance with the pattern of light to which the coating 77 was exposed. The grating 25 is then baked to harden the remaining coating 77, and then the hardened coating is aluminised to provide the reflective surface.

The portions of the photosensitive coating 77 which extend outside the beam of light in which the interference pattern is formed, receive no light. In this way, the diffracting area of the grating does not extend over the whole of its reflecting front surface, and the size and shape of the diffracting area is determined by the size and shape of the beam in which the interference pattern is formed, and this may be controlled by a stop (not shown) in the path of the beam.

Because of its simple arrangement, the system of FIG. 10 provides a relatively high degree of ease of manufacture. All the parts other than the grating can be permanently held rigidly in place, and the position of the grating can be defined precisely and reproducibly by the jig which holds it. In this way, the method of manufacture has a high degree of reproducibility, that is to say that it is possible to make a plurality of gratings having substantially identical characteristics. It should be noted that in the detailed alignment of the parts of the system of FIG. 10, it may be necessary to take into account any refractive effect the grating blank may have on the light passing through it.

Figure 12:
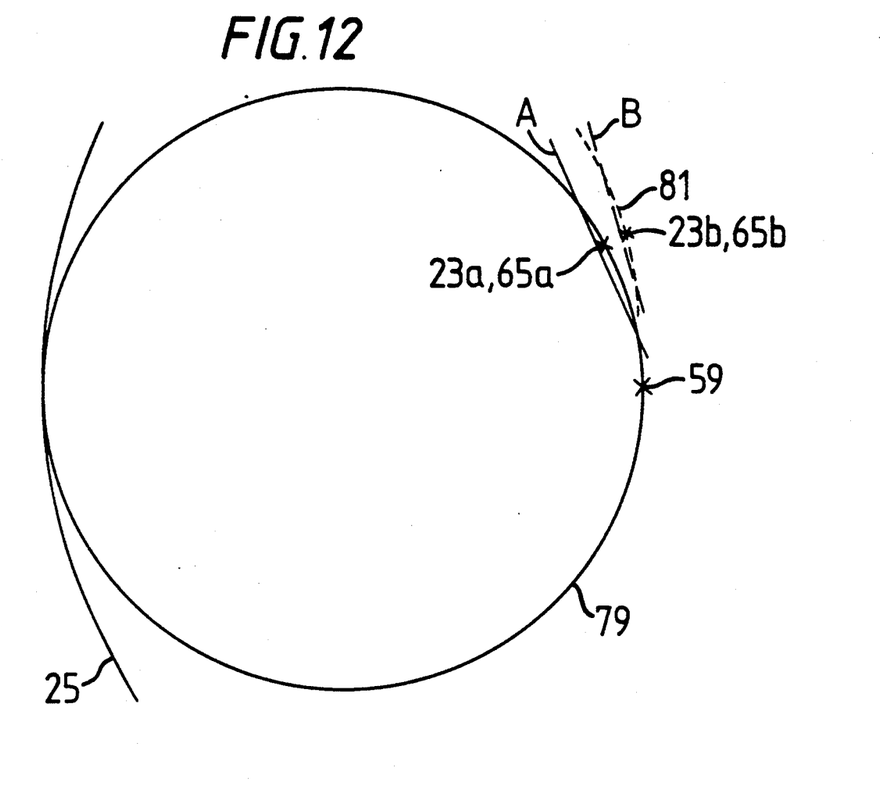
FIG. 12 is a schematic indication of the positions of parts of an analyser of the spectrophotometer of FIG. 1 with reference to a Rowland circle.

Preferably, the position of the grating blank relative to the point 65 is chosen so that in the finished grating the centre of gravity point is not on the Rowland circle defined by the centre of the diffracting area of the grating and its large scale curvature 57. The grating 25 and the Rowland circle are illustrated in FIG. 12. The radius of the Rowland circle is half the radius of the large scale curvature 57 of the grating 25, so that the centre of curvature point 59 also falls on the Rowland circle 79, diametrically opposite the point where the circle touches the grating.

As is well known, for a conventional concave diffraction grating, if the aperture 23 and the photodiode array 29 are also placed on the Rowland circle 79, the spectrum formed by the diffraction grating will be in focus on the photodiode array. In the case of the blazed grating manufactured by the process described above, this also requires that the centre of gravity point 65 is on the Rowland circle 79.

In such an arrangement, the entrance aperture 23 and the point 65 will be at a position 23a,65a on the Rowland circle 79 spaced slightly from the point 59. In order to keep the spectrum formed by the diffraction grating 25 in near-perfect focus over the length of the photodiode array 29, it should be placed in position A in FIG. 12, where it forms a chord to the Rowland circle 79.

The angle which the photodiode array 29 makes to the grating 25 affects the function relating change in the wavelength of light falling on the photodiode array with position along the array. Typically, in the position A shown in FIG. 12, this function is substantially nonlinear, and is instead as illustrated at A in the graph of this function shown in FIG. 13. At no angle of the photodiode array 29 will this graph be precisely linear, but it is possible to find an optimum angle at which the graph is considerably straighter than line A of FIG. 13. However, if the photodiode array 29 is moved into this optimum angle, the degree of focus of the spectrum at most positions along the photodiode array 29 will be worsened.

In order to reconcile these conflicting requirements, the point 65 is selected to be at a position 65b which is off the Rowland circle 79. This alters the diffractive focal length for the grating. The entrance aperture 23 is arranged at a position 23b which, together with the different diffractive focal length, defines a different surface of focus 81, shown in dotted lines in FIG. 12, for the light diffracted from the grating 25. The positions 65b.23b are selected so that the angle of the surface of focus 81 at the position of the photodiode array 29 is close to the ideal angle of the photodiode array 29 for the most linear relationship between change in wavelength and change in position along the photodiode array. The photodiode array 29 can now be mounted in position B, shown in a broken line in FIG. 12, at which it adopts an angle with near optimum linearity while maintaining a high degree of focus for the diffracted light at all positions along the array. The relationship between change in wavelength and change in position along the photodiode array 29 for this position is shown by line B in FIG. 13. A slight residual non-linearity remains.

Figure 13:
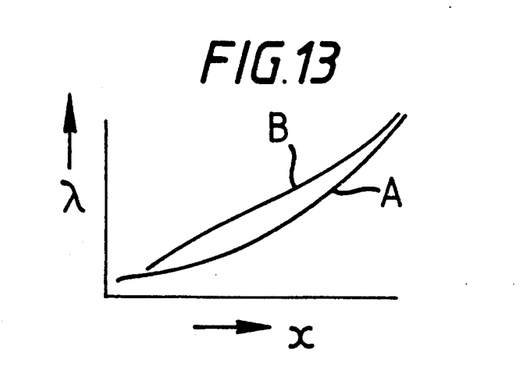
FIG. 13 is a graph showing change of wavelength of diffracted light with change of position along the photosensor array of an analyser of the spectrophotometer of FIG. 1.

In manufacture of the spectrophotometer, the position of the photodiode array 29 is selected for optimum linearity of the graph of FIG. 13, and the position of point 65 (as determined by the positioning of the grating blank during the manufacture of the grating) is selected to enable a high degree of focus of the diffracted light at all positions along the photodiode array 29. Following the determination of the positions of the photodiode array 29, the grating 25 and the point 65, the position of the entrance aperture 23 is moved so as to obtain the correct focus of the light on the photodiode array 29.

Preferably, the spacing between the centre points of adjacent diodes 49 is made to vary slightly with position along the photodiode array 29. In this way, the difference in wavelength between the centre points of adjacent diodes can be maintained at 10nm in spite of the non-linearities in the distribution of wavelength along the photodiode array 29. It is undesirable to change the width of the active area 83, and therefore this variation is preferably achieved by varying the width of the barrier region 93. If the centre of gravity point 65 is moved off the Rowland circle, and the photodiode array 29 is at position B in FIG. 12, the remaining non-linearities are substantially compensated for by varying the width of the barrier region 93 from 34 $\mu$m at the ends of the photodiode array 29,43 to 22 $\mu$m at the centre of the photodiode array.

In use of the spectrophotometer illustrated in the drawings, the device is initially calibrated. This is done using one or more samples 5 of known colour, and determining the outputs from the diodes 49 of the photodiode array 29 for the known colour sample. Preferably the samples include a perfect white and a perfect black.

Figure 14:
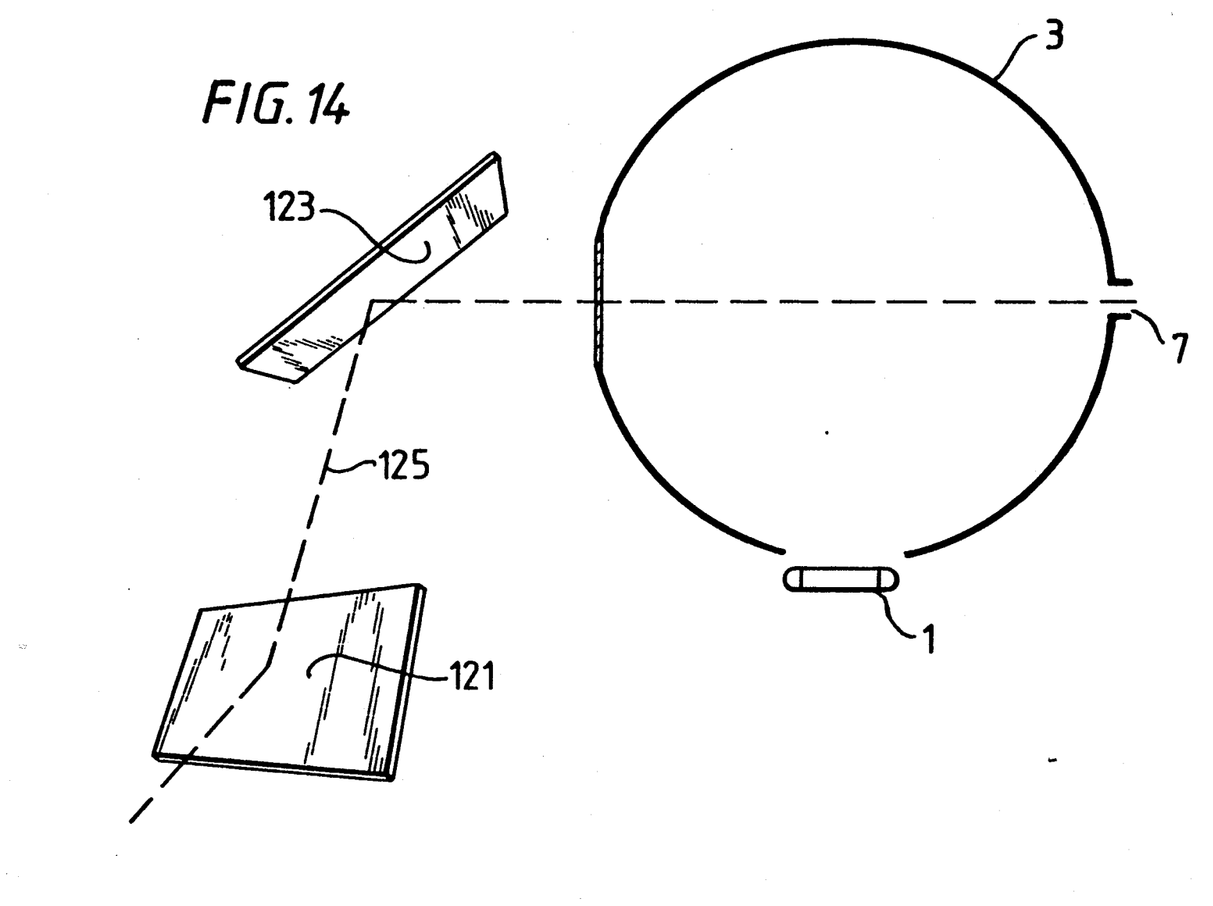
FIG. 14 shows a light absorbing arrangement.

The perfect black sample may be provided by an arrangement as shown in FIG. 14. This shows in broken lines the path of light which passes through the sample beam aperture 7 in the spherical integrator 3, to pass into the sample beam 9. The arrangement comprises two light absorbers, which preferably transmit no more than 0.01% of the light incident on them at the wavelengths of interest. Therefore light can only enter the sample beam 9 by being reflected successively off reflective surfaces 121, 123 of the respective light absorbers. However, the surfaces 121 and 123 are each arranged so as to make a Brewster angle with the light path.

The Brewster angle is an angle, which depends on the refractive index of the reflector, such that when an incident beam strikes a reflector at the Brewster angle, all light in the reflected beam is plane polarised in the direction parallel to the surface of the reflector.

The two reflective surfaces 121, 123 are rotated relative to each other about the line of the portion 125 of the light path between them, such that for light in this light path portion 125, the respective angles of polarisation parallel to the respective surfaces 121, 123 are at right angles to each other. Thus, any light which is reflected from the first surface 121 into the light path portion 125 is plane polarised so as to have no component which can be reflected by the surface 123 into the sample beam 9.

Preferably, a very dark surface such as black velvet is arranged to form the origin of the light path shown in FIG. 14, although experiments have shown that even if a white surface such as a sheet of ordinary paper is placed at the beginning of the light path, the amount of light reaching the sample beam 9 with this arrangement is extremely small.

The arrangement of reflective surfaces making Brewster angles with a light path and arranged effectively as crossed polarisers in the light path, may also be used in other circumstances where it is desired to minimise the amount of light which leaves a location in a particular direction.

Following calibration, a sample 5 of unknown colour may be positioned as shown in FIGS. 1 and 2. The values of the forty outputs from the forty diodes 49 of the sample analyser are then compared with the corresponding values from the forty diodes 49 of the reference analyser 39, to obtain normalised values in which effects of the characteristics of the illuminating light within the spherical integrator 3 have been compensated for. The pattern of the normalised values can be used as a description of the colour of the sample 5. If the value for each diode is taken as an intensity value at the wavelength corresponding to the centre point of the diode, it is possible to define a line of best fit to the normalised diode values, as a function of intensity with wavelength.

The normal use for such a spectrophotometer is to compare the colour characteristics of different samples, so as to monitor the colour consistency of the samples. The samples may be, for instance, fabrics, paints or coloured printed surfaces. Typically, a colour reference sample would be used, and the colour characteristic pattern of the reference sample would be compared with the colour characteristic patterns obtained from samples taken from a batch of material which is intended to have the sample colour as the colour reference sample.

Although the diodes 49 are spaced apart by 10 nm in wavelength of light, differences in colour between two samples can be detected to a much greater resolution. If two samples have different curves of best fit to the normalised output values of the diodes in the function of intensity against wavelength, as described above, the magnitude of the difference between the two curves can be defined by known mathematical techniques. With a spectrophotometer of the type illustrated in the drawings, it may be possible to distinguish between the curves for two samples which are substantially identical except that the curve for one sample is shifted in wavelength relative to the curve of the other sample by as little as 0.1 nm, or possibly even less.

In order to make the determinations of colour characteristics of a sample, and make comparisons between the colour characteristics of different samples, as described above, the outputs of the diodes 49 may be processed in a computer in a known manner.

As will be appreciated by those skilled in the art, various modifications and alternatives to the details described and illustrated in the drawings are possible. For example, a further lens may be placed in the sample beam 9, so as to image the sample 5 in the plane of the entrance aperture 23. Alternatively, the lens 19 may be replaced by a lens arrangement which is movable along the sample beam 9 between the aperture 7 in the diffuser 3 and the entrance aperture 23.

In the manufacturing method described with reference to FIGS. 10 and 11, the concave mirror 73 creates an interference pattern centred on the point 65. Typically the concentric light and dark shells will be spherical, so that the steps 61 on the grating 25 will each be part of a respective sphere. However, a different shape could be used for the concave mirror 73, resulting in a differently shaped interference pattern and therefore differently shaped steps 61 on the grating 25. This may be useful in reducing or compensating for unwanted optical features of the spectrophotometer such as aberrations, for example the astigmatism due to the tilt of the grating which directs the negative first order diffracted beam to the photodiode array 29 instead of the entrance aperture 23. Preferably in this case the shells 63 of which the steps 61 form part are shaped so as to have, or approximate to having, two foci (instead of the one focus which a sphere has).

Although the illustrated embodiment of the present invention has been described as measuring colour within the visible spectrum, embodiments may measure colour over a range which is partly or wholly outside the visible spectrum, and the words "colour" and "light" should accordingly be construed to cover non-visible parts of the spectrum.

I claim:

1. A system for measuring electromagnetic spectra, the system comprising a diffraction granting and a photosensor means operable to detect light diffracted by said grating, in which said grating is curved and has a grating pattern corresponding to a pattern at the grating of interference between light incident on a reflector and light reflected from the reflector, said interference pattern having a center of gravity of the region of best focus of lines normal to surfaces of constructive or destructive interference in the region of the grating pattern which center of gravity is off the Rowland circle defined by the center of the grating and the curvature of the grating.

2. A system according to claim 1, in which the photosensor means is a stationary array providing outputs in response to a plurality of different wavelengths of light.

3. A system according to claim 1, comprising first and second said gratings, first and second said photosensor means and means to provide a comparison beam of light, the first grating and the first photosensor means receiving in use light originating from a sample the colour of which is to be measured and the second grating and the second photosensor receiving light from the comparison beam.

4. A system according to claim 1, in which said grating pattern corresponds to an interference pattern comprising a plurality of concentric substantially spherical shells.

5. A system according to claim 2, comprising a wall having an aperture therein, and in which light passing through said aperture falls on the grating and is diffracted to the photosensor array, and the photosensor array has an angle to the grating which provides maximum linearity of the distribution of wavelength of the diffracted light along the array, the positions of said centre of gravity and said aperture defining a surface of focus for the diffracted light which has an angle substantially equal to that of the photosensor array for a wavelength of light which falls on the photosensor array.

6. A system according to claim 1 in which said grating corresponds to an interference pattern comprising a plurality of non-spherical shells.

7. A system according to claim 1 in which said photosensor means comprises a photosensor array having a plurality of photosensors distributed in a first direction, the pitch of said distribution being non-uniform.

8. A system according to claim 7 in which the extent of each said photosensor in the first direction is the same, the said photosensors being spaced from each other by varying distances.

9. A system according to claim 7 in which the photosensor array is an integrated semiconductor array.

* * * * *